United States Patent
Said et al.

(10) Patent No.: US 10,901,994 B2
(45) Date of Patent: Jan. 26, 2021

(54) FINE GRANULAR APPLICATION-SPECIFIC COMPLEX FILTERS IN REMOTE ANALYTICAL APPLICATION INTEGRATION

(71) Applicant: SAP SE, Walldorf (DE)

(72) Inventors: Bare Said, St. Leon-Rot (DE); Tobias Hoehmann, Walldorf (DE); Peter Weddeling, Sinsheim (DE); Hristina Dinkova, Walldorf (DE); Mehdi Hsoumi, Walldorf (DE)

(73) Assignee: SAP SE, Walldorf (DE)

( * ) Notice: Subject to any disclaimer, the term of this patent is extended or adjusted under 35 U.S.C. 154(b) by 112 days.

(21) Appl. No.: 15/999,512

(22) Filed: Aug. 20, 2018

(65) Prior Publication Data

US 2019/0340289 A1    Nov. 7, 2019

Related U.S. Application Data

(60) Provisional application No. 62/666,232, filed on May 3, 2018.

(51) Int. Cl.
*G06F 16/2455*    (2019.01)
*G06F 16/248*    (2019.01)
(Continued)

(52) U.S. Cl.
CPC ......... *G06F 16/2455* (2019.01); *G06F 9/466* (2013.01); *G06F 16/23* (2019.01);
(Continued)

(58) Field of Classification Search
CPC .. G06F 16/2455; G06F 9/466; G06F 16/9024; G06F 16/2465; G06F 16/23; G06F 16/248; G06F 9/543
(Continued)

(56) References Cited

U.S. PATENT DOCUMENTS 6,513,154 B1    1/2003 Porterfield
7,225,432 B2    5/2007 Jentsch et al.
(Continued)

OTHER PUBLICATIONS

U.S. Appl. No. 16/048,863, Kazmaier et al., filed Jul. 30, 2018.
(Continued)

*Primary Examiner* — Michael Pham
(74) *Attorney, Agent, or Firm* — Fish & Richardson P.C.

(57) ABSTRACT

Implementations include actions of receiving, by a QMS executed within a first data center, a query definition provided from a browser of an analytics platform executed within the second data center, providing, by the QMS, a raw calculation scenario as an object model based on the query definition, and one or more filters, processing, by the QMS, the raw calculation scenario to provide an enhanced calculation scenario, the enhanced calculation scenario incorporating one or more relationships based on at least one of the one or more filters, executing, by a calculation engine within the first data center, the enhanced calculation scenario to provide an analytical artifact including a query-level calculation view on transactional data, and transmitting, by the first data center, the analytical artifact to the second data center to perform analytics on at least a portion of the transactional data stored in the first data center.

20 Claims, 10 Drawing Sheets

(51) Int. Cl.
  *G06F 16/23* (2019.01)
  *G06F 16/2458* (2019.01)
  *G06F 16/901* (2019.01)
  *G06F 9/46* (2006.01)

(52) U.S. Cl.
  CPC ........ *G06F 16/248* (2019.01); *G06F 16/2465* (2019.01); *G06F 16/9024* (2019.01)

(58) Field of Classification Search
  USPC ...................................................... 707/776
  See application file for complete search history.

(56) References Cited

U.S. PATENT DOCUMENTS

| | | | |
|---|---|---|---|
| 7,225,433 | B2 | 5/2007 | Jentsch et al. |
| 7,315,853 | B2 | 1/2008 | Brunswig et al. |
| 7,454,660 | B1 | 11/2008 | Kolb et al. |
| 7,480,920 | B2 | 1/2009 | Brendle et al. |
| 7,487,512 | B2 | 2/2009 | Brunswig et al. |
| 7,533,103 | B2 | 5/2009 | Brendle et al. |
| 7,536,673 | B2 | 5/2009 | Brendle et al. |
| 7,673,245 | B2 | 3/2010 | Weddeling et al. |
| 7,676,816 | B2 | 3/2010 | Brunswig et al. |
| 7,685,114 | B2 | 3/2010 | Brunswig et al. |
| 7,685,268 | B2 | 3/2010 | Brunswig et al. |
| 7,685,568 | B2 | 3/2010 | Brendle et al. |
| 7,698,174 | B2 | 4/2010 | Brunswig et al. |
| 7,702,650 | B2 | 4/2010 | Brunswig et al. |
| 7,725,907 | B2 | 5/2010 | Bloching et al. |
| 7,730,412 | B2 | 6/2010 | Said et al. |
| 7,765,494 | B2 | 7/2010 | Brunswig et al. |
| 7,769,821 | B2 | 8/2010 | Brunswig et al. |
| 7,770,146 | B2 | 8/2010 | Brunswig et al. |
| 7,774,463 | B2 | 8/2010 | Bloching et al. |
| 7,778,965 | B2 | 8/2010 | Bindewald et al. |
| 7,797,370 | B2 | 9/2010 | Brunswig et al. |
| 7,801,996 | B2 | 9/2010 | Brunswig et al. |
| 7,810,102 | B2 | 10/2010 | Brendle et al. |
| 7,823,120 | B2 | 10/2010 | Kazakov et al. |
| 7,996,814 | B1 | 8/2011 | Qureshi et al. |
| 8,510,712 | B1 | 8/2013 | Killmar, III |
| 8,719,770 | B2 | 5/2014 | Balani et al. |
| 9,256,762 | B1 | 2/2016 | Roth et al. |
| 9,489,423 | B1 | 11/2016 | Muthiah et al. |
| 9,760,601 | B2 * | 9/2017 | Burke ................... G06Q 10/00 |
| 10,182,073 | B2 | 1/2019 | Redlich et al. |
| 10,606,825 | B1 | 3/2020 | Sosonkin et al. |
| 2004/0199818 | A1 | 10/2004 | Boilen et al. |
| 2005/0021557 | A1 | 1/2005 | Brendle et al. |
| 2005/0022157 | A1 | 1/2005 | Brendle et al. |
| 2005/0138113 | A1 | 6/2005 | Brunswig et al. |
| 2006/0004699 | A1 | 1/2006 | Lehikoinen et al. |
| 2006/0080426 | A1 | 4/2006 | Brunswig et al. |
| 2006/0101403 | A1 | 5/2006 | Sharma et al. |
| 2006/0242207 | A1 | 10/2006 | Tsyganskiy et al. |
| 2007/0006041 | A1 | 1/2007 | Brunswig et al. |
| 2007/0061431 | A1 | 3/2007 | Brunswig et al. |
| 2007/0073702 | A1 | 3/2007 | Brunswig et al. |
| 2007/0100943 | A1 | 5/2007 | Brunswig et al. |
| 2007/0124740 | A1 | 5/2007 | Brunswig et al. |
| 2007/0157167 | A1 | 7/2007 | Brendle et al. |
| 2007/0226751 | A1 | 9/2007 | Brendle et al. |
| 2007/0233728 | A1 | 10/2007 | Puteick et al. |
| 2007/0271107 | A1 | 11/2007 | Fiedler et al. |
| 2007/0288885 | A1 | 12/2007 | Brunel et al. |
| 2008/0005623 | A1 | 1/2008 | Said et al. |
| 2008/0010074 | A1 | 1/2008 | Brunswig et al. |
| 2008/0120129 | A1 | 5/2008 | Seubert et al. |
| 2008/0120597 | A1 | 5/2008 | Brunswig et al. |
| 2008/0120602 | A1 | 5/2008 | Comstock et al. |
| 2008/0147455 | A1 | 6/2008 | Brunswig et al. |
| 2008/0148166 | A1 | 6/2008 | Brunswig et al. |
| 2008/0168135 | A1 | 7/2008 | Redlich et al. |
| 2008/0173702 | A1 | 7/2008 | Meister |
| 2008/0244616 | A1 | 10/2008 | Brunswig et al. |
| 2008/0276225 | A1 | 11/2008 | Saterdag et al. |
| 2008/0301628 | A1 | 12/2008 | Lochmann |
| 2009/0019424 | A1 | 1/2009 | Klein et al. |
| 2009/0144721 | A1 | 6/2009 | Wagner et al. |
| 2009/0150473 | A1 | 6/2009 | Brunswig et al. |
| 2009/0313606 | A1 | 12/2009 | Geppert et al. |
| 2010/0095276 | A1 | 4/2010 | Ottavi et al. |
| 2012/0072884 | A1 | 3/2012 | Balko et al. |
| 2012/0198369 | A1 * | 8/2012 | Sorin ..................... G06Q 10/10 |
| | | | 715/763 |
| 2013/0018890 | A1 | 1/2013 | Rajan et al. |
| 2013/0042219 | A1 | 2/2013 | Said et al. |
| 2013/0166534 | A1 | 6/2013 | Yoon et al. |
| 2013/0346380 | A1 | 12/2013 | Dong et al. |
| 2014/0172827 | A1 * | 6/2014 | Nos ....................... G06F 16/245 |
| | | | 707/722 |
| 2014/0279839 | A1 * | 9/2014 | Balzar ..................... G06F 9/466 |
| | | | 707/607 |
| 2015/0074037 | A1 * | 3/2015 | Sarferaz ............... G06F 16/252 |
| | | | 707/602 |
| 2015/0347542 | A1 | 12/2015 | Sullivan et al. |
| 2016/0055222 | A1 * | 2/2016 | Sarferaz ............... G06F 16/254 |
| | | | 707/603 |
| 2017/0124152 | A1 | 5/2017 | Nerurkar et al. |
| 2018/0246948 | A1 | 8/2018 | Florendo et al. |
| 2019/0340285 | A1 | 11/2019 | Said et al. |
| 2019/0340286 | A1 | 11/2019 | Said et al. |
| 2020/0034480 | A1 | 1/2020 | Kazmaier et al. |

OTHER PUBLICATIONS

Non-Final Office Action issued in U.S. Appl. No. 15/999,388 dated Jul. 31, 2020, 23 pages.

Non-Final Office Action issued in U.S. Appl. No. 15/999,389 dated Jun. 9, 2020, 19 pages.

Final Office Action issued in U.S. Appl. No. 15/999,388 dated Nov. 2, 2020, 16 pages.

* cited by examiner

US 10,901,994 B2

FINE GRANULAR APPLICATION-SPECIFIC COMPLEX FILTERS IN REMOTE ANALYTICAL APPLICATION INTEGRATION

CROSS-REFERENCE TO RELATED APPLICATIONS

This application claims the benefit of, and priority to U.S. Prov. App. No. 62/666,232, filed on May 3, 2018, the disclosure of which is expressly incorporated herein by reference in the entirety.

BACKGROUND

Enterprises can use third-party systems to maintain data, and analyze data. In some examples, data maintenance, and data analysis are performed in different data centers. For example, an enterprise can maintain its production data in a first data center, and can perform analytics on its production data in a second data center. In analyzing the data, technological inefficiencies can occur. For example, transmitting data from the first data center to the second data center can require a significant amount of technical resources (e.g., processors, memory, bandwidth). Further, storing redundant data in multiple data centers (e.g., production data in the first data center, and a copy of the production data in the second data center for analysis) burdens technical resources (e.g., memory).

SUMMARY

Implementations of the present disclosure include computer-implemented methods for data analytics across multiple data centers. More particularly, implementations of the present disclosure are directed to computer-implemented methods for analytical application integration based on a remote services plug-in. In some implementations, actions include receiving, by a query manager service (QMS) executed within a first data center, a query definition provided from a browser of an analytics platform executed within a second data center, providing, by the QMS, a raw calculation scenario as an object model based on the query definition, and one or more filters, processing, by the QMS, the raw calculation scenario to provide an enhanced calculation scenario, the enhanced calculation scenario incorporating one or more relationships based on at least one of the one or more filters, executing, by a calculation engine within the first data center, the enhanced calculation scenario to provide an analytical artifact including a query-level calculation view on transactional data stored in the first data center, transmitting, by the first data center, the analytical artifact to the second data center to perform analytics on at least a portion of the transactional data stored in the first data center. Other implementations of this aspect include corresponding systems, apparatus, and computer programs, configured to perform the actions of the methods, encoded on computer storage devices.

These and other implementations can each optionally include one or more of the following features: the raw calculation scenario is an analytical calculation scenario represented by a directed acyclic graph, in which one or more base calculation views from the first data center are connected using join relationships; the one or more filters are provided based on user-specific permission metadata that is retrieved from an application executing within the first data center; the enriched query calculation scenario is transferred into an analytical representation that is passed to the calculation engine for execution to provide the analytical artifact; the raw calculation scenario is processed by a filter and wrangling engine to provide the enriched calculation scenario, the filter and wrangling engine applying column-specific filters, and enabling combination of arbitrary columns to tailor the analytical artifact; the one or more filters include at least one scope filter that describes joining of at least a portion of data from a data sources, and that indicates at least one parameter to affect data that is to be joined; and at least a portion of the transactional data is provided from execution of the application within the first data center.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure include computer-implemented methods for data analytics across multiple data centers. More particularly, implementations of the present disclosure are directed to computer-implemented methods for analytical application integration based on a remote services plug-in. Implementations can include actions of receiving, by a query manager service (QMS) executed within a first data center, a query definition provided from a browser of an analytics platform executed within a second data center, providing, by the QMS, a raw calculation scenario as an object model based on the query definition, and one or more filters, processing, by the QMS, the raw calculation scenario to provide an enhanced calculation scenario, the enhanced calculation scenario incorporating one or more relationships based on at least one of the one or more filters, executing, by a calculation engine within the first data center, the enhanced calculation scenario to provide an analytical artifact including a query-level calculation view on transactional data stored in the first data center, transmitting, by the first data center, the analytical artifact to the second data center to perform analytics on at least a portion of the transactional data stored in the first data center.

Figure 1:
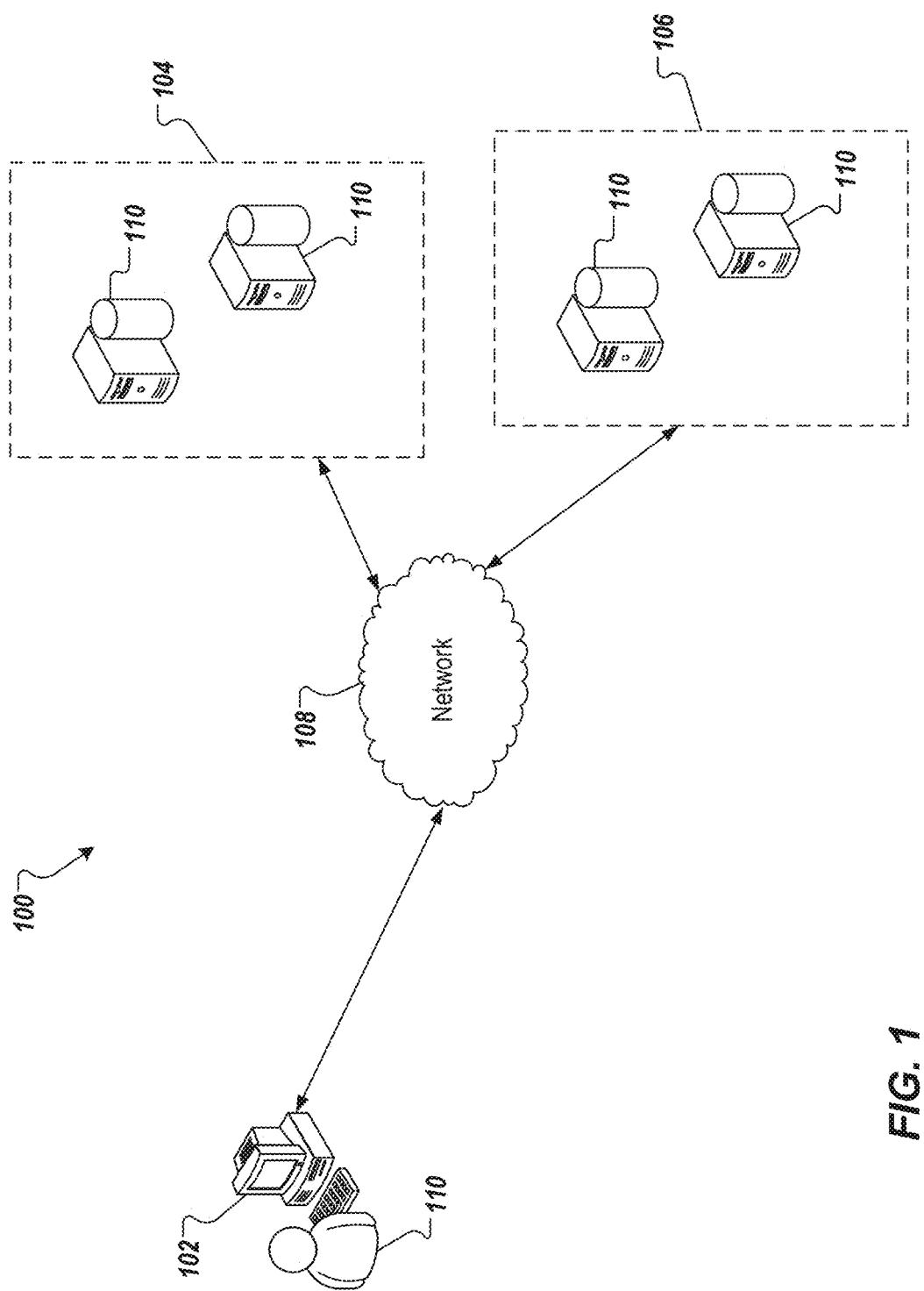
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, data centers 104, 106, and a network 108. Each data center 104, 106 includes one or more server devices 110. In the depicted example, a user 110 interacts with the client device 102. In an example context, the user 110 can include a user, who interacts with an application that is hosted in the data center 104.

In some examples, the client device 102 can communicate with one or more of the data centers 104, 106 over the network 108. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 108 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 110 includes at least one server and at least one data store. In the example of FIG. 1, the server devices 110 are intended to represent various forms of servers including, but not limited to a web server, an application server, a proxy server, a network server, and/or a server pool. In general, server systems accept requests for application services, and provides such services to any number of client devices (e.g., the client device 102) over the network 106. In accordance with implementations of the present disclosure, the data center 104 can host a data analytics platform, and the data center 106 can host development, test, and/or production systems, and store production data, and/or test data. In some examples, the data center 106 can be referred to as a transactional system (e.g., executing applications an enterprise uses for its operations, and storing respective data models, and data). For example, an enterprise can run operations at least partially based on applications hosted in the data center 106, which operations can create, modify, process, and store production data (transaction data), among other activities.

To provide context for implementations of the present disclosure, enterprises can use third-party systems to maintain data, and analyze data. In some examples, data maintenance, and data analysis are performed in different data centers. For example, and with reference to FIG. 1, an enterprise can maintain its production data in the data center 106, and can perform analytics on its production data in the data center 104. In analyzing the data, technological inefficiencies can occur. For example, transmitting data from the data center 106 to the data center 104 can require a significant amount of technical resources (e.g., processors, memory, bandwidth). Further, storing redundant data in multiple data centers (e.g., production data in the data center 106, and a copy of the production data in the data center 104 for analysis) burdens technical resources (e.g., memory). Other challenges can include the preparation of analytical artifacts in the first data center, which analytical artifact are ready-to-use by the analytics platform in the second data center, and which are at the same time already tailored to the specific needs defined by the user of the analytical platform.

In view of this, and as described in further detail herein, implementations of the present disclosure enable provision of analytical artifacts within a first data center for data analytics in a second data center. More particularly, implementations of the present disclosure provide analytical application integration based on a remote services plug-in.

Implementations of the present disclosure are described in further detail with reference to example platforms. It is contemplated, however, that implementations of the present disclosure can be realized with any appropriate platform. A first example platform includes the SAP Analytics Cloud (SAC) provided by SAP SE of Walldorf, Germany. In some examples, SAC is provided as a third-party service that an enterprise can access to perform analytics on its data (e.g., production data used in operations of the enterprise). A second example platform includes SAP SuccessFactors provided by SAP SE of Walldorf, Germany, and can be described as a cloud-based human capital management (HCM) platform. In some examples, the enterprise can use SuccessFactors to perform human resource operations (e.g., payroll, employee engagement, reviews).

Figure 2:
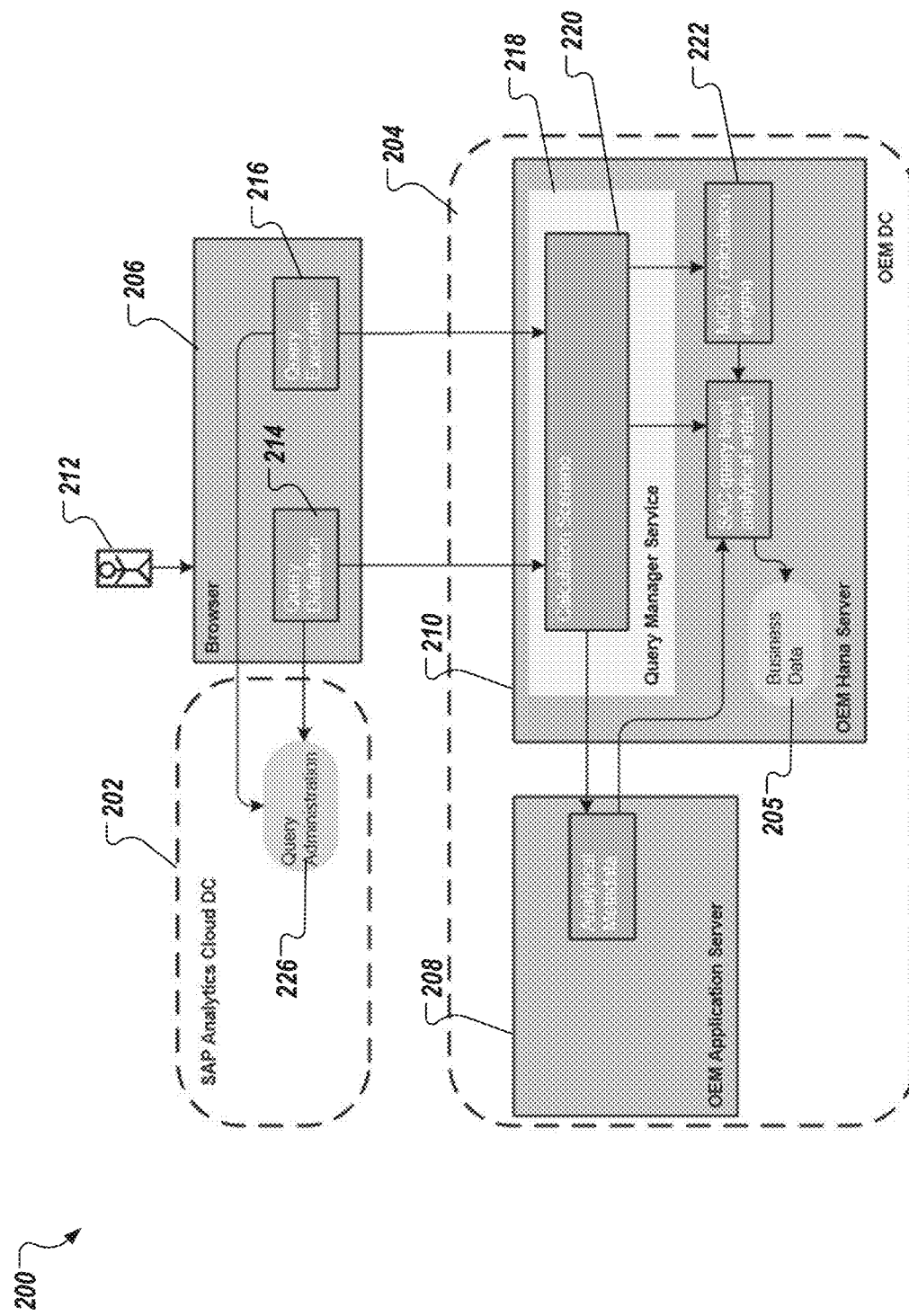
FIG. 2 depicts an example conceptual architecture in accordance with implementations of the present disclosure.

FIG. 2 depicts an example conceptual architecture 200 in accordance with implementations of the present disclosure. The example conceptual architecture 200 includes a data center 202, a data center 204, and a browser 206. In some examples, the data center 202, and the data center 204 can be provided by respective server systems. For example, the data center 202 can be owned by, or operated on behalf of a third-party service provider (e.g., SAP SE, which provides SAC as a cloud-based service). As another example, the data center 204 can be owned by, or operated on behalf of an enterprise that consumes services provided by the third-party service provider. In some examples, the browser 206 is executed on a client-side computing device (e.g., the client device 102 used by the user 110 of FIG. 1).

In some implementations, the data center 202 hosts an analytics platform. In the example context introduced above, the data center 202 hosts the SAC platform. In some implementations, the data center 204 hosts one or more applications used for enterprise operations, and stores enterprise data (transactional data) 205 that can be processed by the analytics platform, as described herein. In the example context introduced above, SuccessFactors is an example application that can be hosted on the data center 204, and data stored in the data center 204 can include employee data (e.g., name, address, hire date, role, permissions, compensation information, review information). As depicted in FIG. 2, the data center 204 includes an application server 208 (e.g., an Apache Tomcat server for execution of SuccessFactors), and a database server 210 (e.g., an SAP HANA server).

In some implementations, a user 212 can interface with the SAC platform using the browser 206. In some examples, the user 212 interfaces with the SAC platform to access analytical reports, retrieve data, run data aggregations, manipulate views on data (e.g., filter, slice), and the like. For example, the browser 206 can display one or more user interfaces (UIs) that enable the user 212 to input data to, and receive data from the SAC platform. In some examples, the device that the browser 206 executes on is in communication with the data center 202 over a network (e.g., the network 108 of FIG. 1). In some implementations, the user 206 defines queries to provide a query definition 214. A query execution 216 is performed based on the query definition 214 to retrieve data from the data center 204, which is to be processed in the analytics platform in the data center 202.

Figure 3:
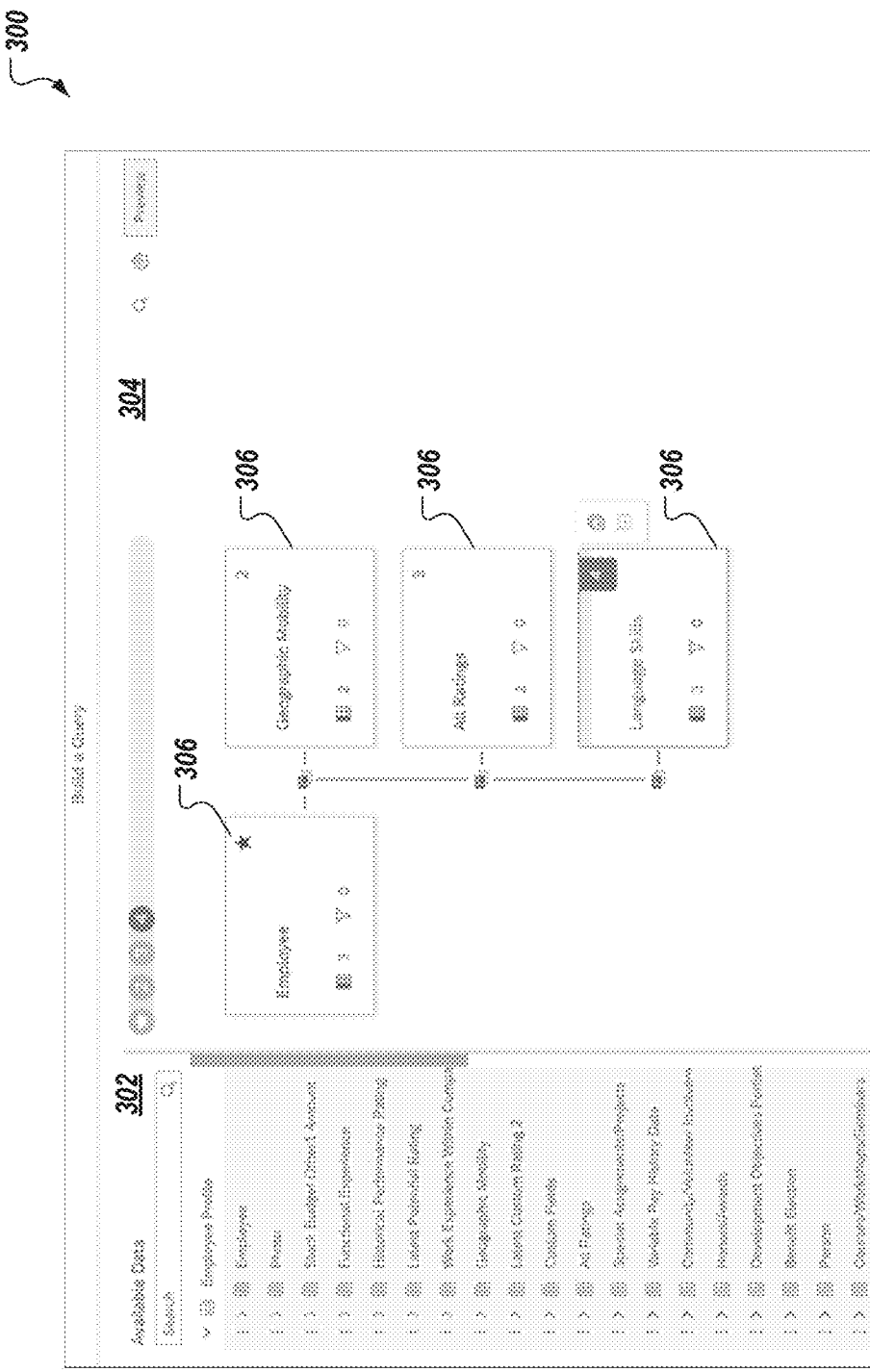
FIG. 3 depicts an example query builder user interface in accordance with implementations of the present disclosure.

FIG. 3 depicts an example query builder UI 300 in accordance with implementations of the present disclosure. In some examples, the query builder UI 300 is displayed by the browser 206 enabling the user 212 to define queries using, for example, drag-and-drop functionality. The query builder UI 300 displays available data 302 for constructing a query (e.g., employee profile data, such as, name, photo, functional experience, performance rating(s), honors/awards, language skills, geographic mobility, and the like). The user 212 can select a data type (e.g., click on), drag the data type to a query panel 304, and drop the data type to the query panel 304. In response, a graphical representation 306 of the respective data type is displayed in the query panel 306. In the example of FIG. 3, graphical representations 306 are provided for example data types of employee (e.g., name), geographic mobility, all ratings, and language skills. The graphical representations 306 can be moved, and connected to one another to provide the query definition 214.

In accordance with implementations of the present disclosure, and referring again to FIG. 2, the data center 204 includes a QMS 218. In some implementations, the QMS 218 is provided as a plug-in component to the database server 210 (e.g., Java-based code that is injected into the database server 210). In some implementations, and as described in further detail herein, the QMS 218 coordinates execution of user queries that are input using the browser 206 (e.g., the query builder UI of FIG. 3). In some examples, the browser 206 communicates with the QMS 218 using one or more application programming interface (API) calls through one or more APIs.

In some implementations, the QMS 218 includes a calculation scenario 220. A calculation scenario is an object model that can be used to generate representations of analytical artifacts (e.g., calculation views, SQL views). In some examples, each calculation scenario can be used, in hand with a calculation engine 222, to generate a corresponding analytical artifact 224 in the database server 210. These analytical artifacts 224 are streamlined for usage in the analytics platform (e.g., SAP SAC) of the data center 202.

In some examples, the calculation scenario is defined by the user 212 using the browser 206. In some examples, the calculation scenario is represented as a graph, in which base calculation views on the data in the data center 204 are connected using join relationships. In some examples, the user 212 can compose a set of columns out of the base calculation views, which are tailored to the specific need. The calculation scenario 220 can be enhanced in the browser 206 by further specific analytical metadata (e.g., different types of filters, data wrangling of different columns). In some implementations, the QMS provides an analytical artifact based on the user query. An example analytical artifact can include a query-level calculation view in the database server 210. Accordingly, the query execution at runtime is based on the analytical artifact. In this manner, an abundant set of analytical requirements can be directly consumed on top of the transactional database tables of the data center 204 using the calculation engine 222.

In further detail, the data center 204 provides analytical metadata in a predefined format. In some examples, the predefined format includes a structured list of base artifacts (e.g., base calculation views, table functions, SQL views, database tables) that are listed in a metadata interface. In addition, columns for each data source, and join information between the different base data sources are provided.

An example calculation scenario format is provided as:

```
{
    "globalProperties":{...},
    "dataSources": [{...}],
    "queryModel": {...}
}
```

In some examples, a query name (queryName) defines an identifier of the calculation view. For example:

```
"globalProperties": {
    "queryName": "String",
    "description":"String"
}
```

In some examples, data sources (dataSources) represent the smallest granularity in the query builder. Example data sources can include, without limitation, calculation views, SQL views, and tables. Example pseudo-code includes:

```
"dataSources": [{
    "id": "String",
    "dataSourceDefinition":{...},
    "fields": [{...}],
    "metadataLink":{...}
},
```

In some examples, a definition for a data source can be provided as:

```
"dataSourceDefinition": {
    "type": "calculationView | sqlView | table ",
    "schemaName": "String (optional for calc views)",
    "packageName": "String",
    "objectName": "String"
}
```

In some examples, a metadata link can be provided as:

```
"metadataLink': {
    "logicalModelId": "String",
    "logicalObjectId": "String"
},
```

In some examples, each data source contains a set of fields. Example fields can include, without limitation, attributes, and measures. For example:

```
"fields": [{
    "id": "String",
    "description": "String",
    "reportingType": " ATTRIBUTE | MEASURE ",
    "semanticType": "String (optional)",
    "unitFieldId": {"dataSourceId":"String", "fieldId":"String"}
    "labelField": {"dataSourceId":"String", "fieldId":"String"}
    "translations": [{
        ...
    }]
```

In some examples, the description of the field can be provided in multiple languages. For example, field labels can be displayed in the logon language of the use. For example:

```
"translations": [{
    "locale": "en_US",
    "labelFieldDescription": "last Name"
}]
```

In some implementations, the query model can be provided as:

```
"queryModel": [{
    "outputFields": [{...}],
    "joins": [{...}],
    "scopeFilters": [{...}],
    "filter": {...},
    "variables": [{....}]},
    "inputParameters":[{...}]}
]
```

In some implementations, output fields (outputFields) can be provided as:

```
"outputFields": [{
    "dataSourceId": "String",
    "type": "DATA_SOURCE_FIELD | CALCULATED_COLUMN_FIELD",
    "fieldId": "String"
}],
```

In some implementations, joins can be provided as:

```
"joins": [{
    "outputDataSourceId": "String",
    "leftDataSourceId": "String",
    "leftDataSourceType": " VIRTUAL | REAL ",
    "rightDataSourceId": "String",
    "rightDataSourceType": " VIRTUAL | REAL ",
    "joinType": "INNER_JOIN | LEFT_OUTER_JOIN | RIGHT_OUTER_JOIN ",
    "mappings": [{...}]
}]
```

In some examples, mappings can be provided as:

```
"mappings": [{
    "sourceDataSourceId": "String, real data source ID",
    "sourceField": "String",
```

*-continued*

```
    "targetDataSourceId": "String, real data source ID",
    "targetField": "String"
}]
```

In some examples, scope filters (scopeFilters) can be used, and can be provided as:

```
"scopeFilters": [{
    "dataSourceId": "String",
    "joinFields": [{...}],
    "inputParameterReferences": [{"id": "String"}],
    "pushDefault":"Boolean"
}]
```

In some examples, join fields (joinFields) can be provided as:

```
"joinFields": [{
    "filterField": "String",
    "targetDataSourceId": "String, real data source ID",
    "targetField": "String"
}],
```

In some examples, input parameter references (inputParameterReferences) can be provided as:

```
"inputParameterReferences": [{
    "id": "String, instance Id of parameter",
    "fieldId": "String, column name of scope view",
    "parameterValue": "String, instance value of parameter, used if no fieldId specified",
    "parameterDataType": "String",
    "selectionType":"FUNCTION",
    "operator": "EQUAL_TO| GREATER_THAN_OR_EQUAL_TO| GREATER_THAN| LESS_THAN| LESS_THAN_OR_EQUAL_TO",
    "inputParameterOfHanaObject": "String, id of input parameter e.g. of table function"
}],
```

In some examples, one or more filters can be applied, and provided as:

```
"filter": {
    "LogicalOperator": "AND | OR",
    "filterOperators": [{...}],
    "logicalConditionNodes": ["..."],
},
```

In some examples, filter operators (filterOperators) can be provided as:

```
"filterOperators": [{
    "operator": "AND | OR",
    "filterOperators": ["..."],
    "logicalConditionNodes": [{...}]
]}
```

In some implementations, one or more logical condition nodes (logicalConditionNodes) can be provided, and are relevant if a value type (logicalConditionNodes.valueType) is equal to FUNCTION. It contains an object of type line of a function. The parameter will be ignored for all other value types. In some examples, logicalConditionNodes.targetField and logicalConditionNodes.targetDataSourceId are only relevant if the value type is equal to COLUMN. The parameters will be ignored for all other value types. In some examples, logicalConditionNodes.values is only relevant if the value type is VALUE_LIST, or PATTERN. The parameter will be ignored for all other value types. For example:

```
"logicalConditionNodes": [{
    "dataSourceId": "String, optional",
    "fieldName": "String",
    "operator": " <LESS_THAN | | AS_OF_DATE | LESS_THAN_EQUAL | GREATER_THAN | GREATER_THAN_EQUAL | EQUAL_TO | NOT_EQUAL | BETWEEN | IN | NOT_IN | IS_NULL | IS_NOT_NULL>",
    "valueType": " <VALUE_LIST | PATTERN | FUNCTION | COLUMN> ",
    "values": [String"],
    "targetField": "String, used for value Type COLUMN",
    "targetDataSourceId": "String, used for value Type COLUMN",
    "function": {
        "id":"<CURRENT_DATE|FIRST_DAY_OF_CURRENT_YEAR|FIRST_DAY_OF_CURRENT_MONTH|FIRST_DAY_OF_CURRENT_WEEK|FIRST_DAY_OF_CURRENT_QUARTER|...>"
        "parameters": [{
            "type":"<CONSTANT|INPUT_PARAMETER>"
            "value": "String",
        }]
    }
}],
```

In some examples, input parameters (InputParameters) can be provided as:

```
"inputParameters": [{
    "id": "String ",
    "properties": {
        "description": "String",
        "parameterType": "<DIRECT|LIST|COLUMN>",
        "isMandatory": "Boolean",
        "isMultipleValues": "Boolean",
        "dataType": "String",
        "length": "Integer",
        "staticValueList": [{
            "id": "String",
            "value": "String"
        }]
    },
    "mappingType": {
        "isConstantMapping": "Boolean",
        "constantValue": "String"
    },
    "defaultValues": [{
        "type": "<CONSTANT|FUNCTION>",
        "value": "If type = CONSTANT: String, if type = FUNCTION: <CURRENT_DATE|...>"
    }]
}]
```

Figure 4:
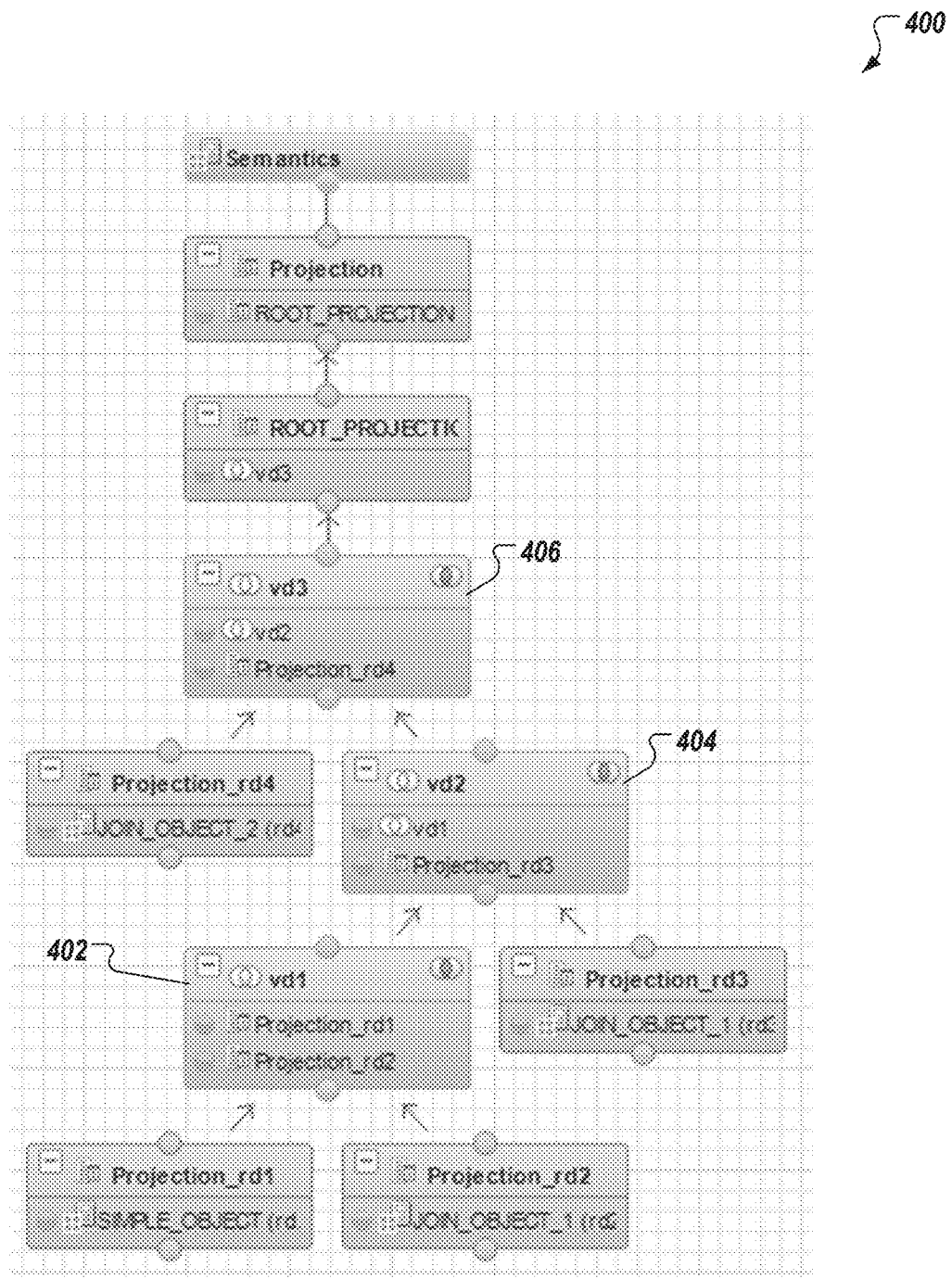
FIG. 4 depicts an example query-level calculation in accordance with implementations of the present disclosure.

FIG. 4 depicts an example query-level calculation 400 in accordance with implementations of the present disclosure. As described herein, data source and associated sets of columns provided by the data center 204 are composed into the analytical artifact 224 (e.g., the query level calculation view). The example of FIG. 4 represents a relatively simple situation, in which three base calculation views 402, 404, 406 (e.g., specific data sources provided in the data center 204) are composed into the overall query level calculation view.

In accordance with implementations of the present disclosure, the connection of the generated query level analytical artifact, and the associated query in the analytical platform are stored as query administration data (e.g., query administration data 226 of FIG. 2) in the data center 202. This enables an analytical story (e.g., SAC-based story) to be executed using the calculation engine 222 directly based on the complex analytical artifact in the data center 204.

Accordingly, implementations of the present disclosure provide live data connectivity of the analytical platform into remote transactional applications (e.g., SAP SuccessFactors, Ariba, Fieldglass). Implementations of the present disclosure provide a mechanism to create analytical artifacts in a generic way in the remote database system of the transactional applications, and a structured definition of analytical metadata is the basis for the creation of these tailored query scenarios. Appropriate analytical artifacts are generated out of this so that the end user analytical queries can run directly run on the remote transaction system without the need of data replication.

Implementations of the present disclosure further provide access control to data that is to be processed in the analytical platform. More particularly, one of the challenges of the remote integration approach described herein is to apply fine granular, user-specific access control for the analytical evaluations. Further, the access control should cover the full range of security as required by the underlying transactional system (e.g., the data center 204 of FIG. 2). In accordance with implementations of the present disclosure, and as described in further detail herein, metadata for row, cell and field permissions are extracted from the remote application server (e.g., the application server 208 of FIG. 2), and are used at runtime of the analytical evaluation to enrich the calculation scenario, which is used to fetch the analytical data.

In further detail, a raw calculation scenario is defined by the user in the browser application of the analytics platform (e.g., the browser 206 of FIG. 2). In some examples, the raw calculation scenario is an analytical calculation scenario represented by a directed acyclic graph, in which the base calculation views from the transactional system (e.g., the data center 204 of FIG. 2) are connected using join relationships. During execution time of the analytical request, the QMS fetches user specific permission metadata from the transactional application (e.g., on the application server 208 of FIG. 2), and provides an enriched calculation scenario incorporating the permission relationships.

In some implementations, the enriched query calculation scenario is transferred into a database, analytical representation by the QMS. This can be, for example, a calculation view, or a SQL view. The analytical representation is passed to the calculation engine to retrieve the aggregated analytical data requested by the user. Through this approach of the present disclosure, is approach the runtime query execution is based on the enriched calculation scenario. In this manner, the full fine granular bandwidth of cell, row and field based permissions of the transactional data center is applied in the user-specific analytical request.

In further detail, the transactional data center provides a set of base calculation data sources (e.g., base calculation views). Each data source is associated with a set of columns for which data is to be fetched at runtime. Data source and set of columns along with the user executing the query provides a context to fetch the relevant permission metadata from the application server. One or more database table functions parametrized for the user are returned, and include the information on row and cell permissions. These table functions are used to construct the fine granular permissions by substituting each lowest level data source of the raw calculation scenario by a corresponding data source-specific permission calculation scenario graph.

Figure 5:
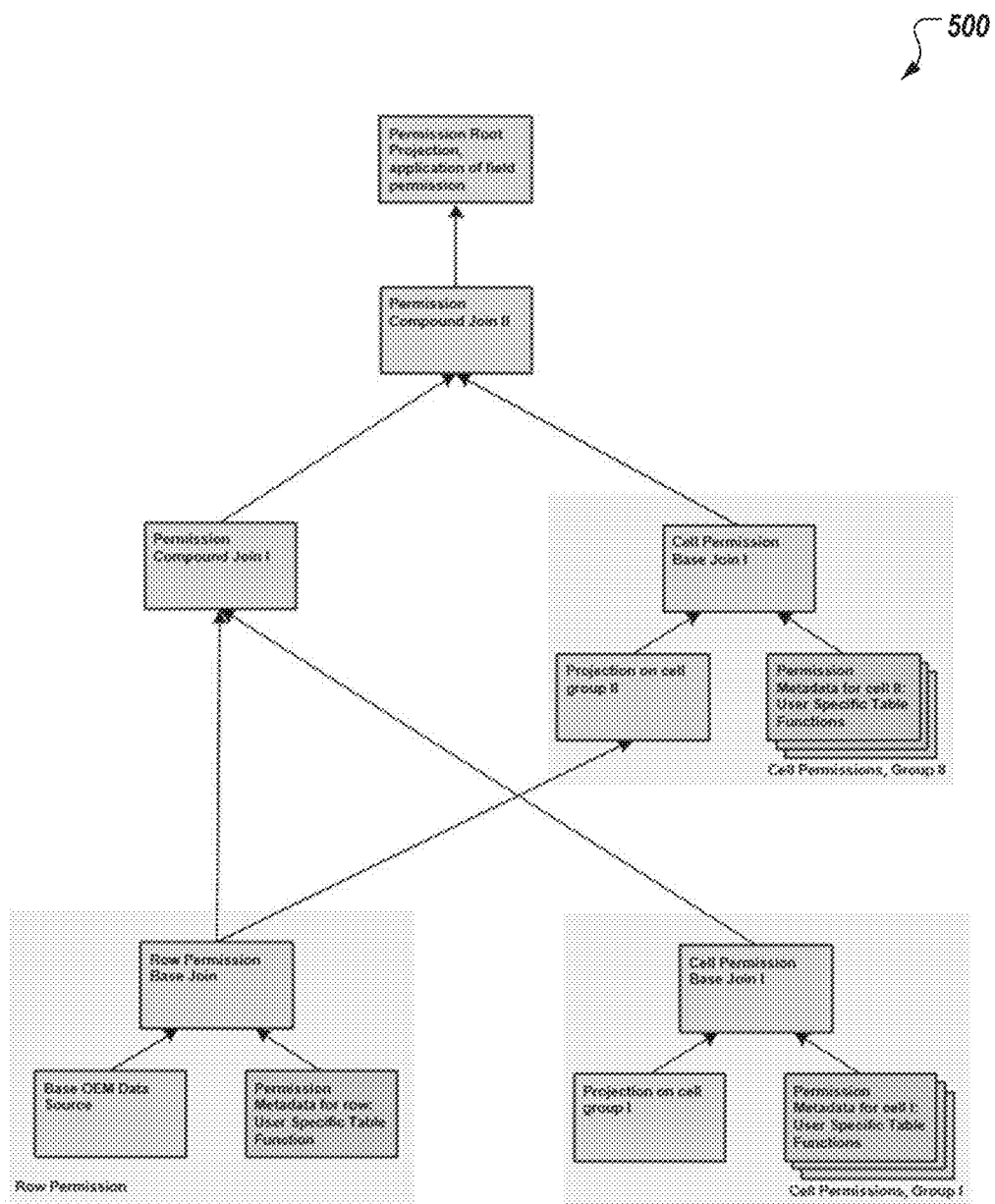
FIG. 5 depicts an example permission calculation in accordance with implementations of the present disclosure.

FIG. 5 depicts an example permission calculation 500 in accordance with implementations of the present disclosure. The specific structure of these data source specific graphs depicted in FIG. 5 represents user-specific permissions for one data source within the transactional system.

In accordance with implementations of the present disclosure, fine granular permissions are applied by substituting each lowest level data source of the raw calculation scenario by a corresponding data source specific permission calculation scenario graph (e.g., the topmost projection in FIG. 5). The specific structure of these data source specific graphs reflects the user specific permissions.

In some examples, in a row permission base join, the base transactional data source is inner-joined with the row permission table function. The overall set of records can be reduced to a relatively large extent by this first row permission join. Accordingly, the row permission base join replaces the base transactional data source in the later cell permission groups, which optimizes the performance of the processing (see arrow from row permission base join to cell permission projection in FIG. 5). In this manner, processing on the full data source is only performed once. It can be noted that an additional topological sorting of the permission graph can be provided for a syntactically correct processing. This is for the example required for the SQL representation used in the Successfactors integration scenario referred to herein by way of example. This can depend on the database server calculation scenario representation, and the specifics of the underlying calculation engine.

In some implementations, a cell permission base join is provided using a projection on the row permission base join for the set of columns. This forms one cell group representing the left join source (left, as viewed in FIG. 5). The right join source (right, as viewed in FIG. 5) is provided as the union of a set of table functions provided by the transactional system for the cell group. In this example, it can be noted that a union of table functions is to be provided, because each table function represents a role to which the user is assigned. Permission to access a column is to be provided if the user has at least one role which grants this permission. In some implementations, the projection on the cell group columns with the union of permission table function is inner-joined to form the cell permission base join.

With regard to a permission compound join, the first compound join is formed as left-outer join between the row permission base join, and the first cell permission base join. In the example of FIG. 5, the cell columns are to be joined from the right side, whereas all other columns are to be joined from the left side, to properly reflect cell permissions. Further permission base joins are formed similarly with the exception that the left data source of the $n^{th}$ permission compound join is be the $(n-1)^{th}$ permission compound join.

In some implementations, the last permission compound join can be linked to the root compound projection. In some examples, the root compound projection is used as a platform to apply the field permissions by means of an initialized calculated attribute for non-permissioned fields. The permission root projection can substitute for the transactional data source in the raw calculation scenario.

Accordingly, implementations of the present disclosure provide a mechanism to apply fine granular, user-specific access control requested by the underlying transactional system (e.g., the data center 204 of FIG. 2) in the context of an analytics platform (e.g., SAC executed in the data center 202 of FIG. 2). This is a required building block for the usage of remote connectivity of such remote transactional systems using the full power of the underlying database architecture. As described herein, this mechanism is based on the substitution of each particular transactional data source in the initial calculation scenario by a specific fine granular calculation scenario, which is based on the permission metadata provided by the transactional system for the user who is processing the analytical request.

Another challenge of integrating transactional application systems with analytics platforms is to apply complex application logic for user-specific filtering in an encapsulated way. A set of complex and specific filter methods reflecting the full application needs is provided by the transactional system. In accordance with implementations of the present disclosure, parametrization and application of the filter methods is done by the QMS (e.g., the QMS 218 of FIG. 2).

To provide further context, scope filters are used to support users in the definition of complex (dynamic) filters that cannot be expressed with simple filter conditions. For example, if a user wants to see data for all employees in his team, how the selection of "all employees in the team of a user" can be performed needs to be defined. It may be possible for a user to specify a constant selection with the set of employees at the point in time the report is executed. However, in this example, the members of a team may change at any point in time, and it can require significant effort to maintain filters. In addition, it may not be possible for the common reporting user to define a set of joins and selections that are necessary to dynamically derive the list of user IDs for the selection of employees in his team.

In view of this, implementations of the present disclosure provide a convenient selection method that enables users to define complex selection with a parameterization of the selection execution behavior. In some implementations, scope filters include an application of scope filter, and a parameterization of scope filter. In some examples, application of a scope filter includes a strategy that is used to execute the selection. In some examples, parametrization of a scope filter includes a set of selection criteria options that are shown on a UI to a user. The selection criteria options are used to parameterize the execution behavior. In some examples, interface elements for selection can range from simple check boxes up to drop down boxes/value help dialogs that are used to select specific values. The user selection is used to set the input parameters of the function/artifact that is used to execute the selection of values.

Figure 6:
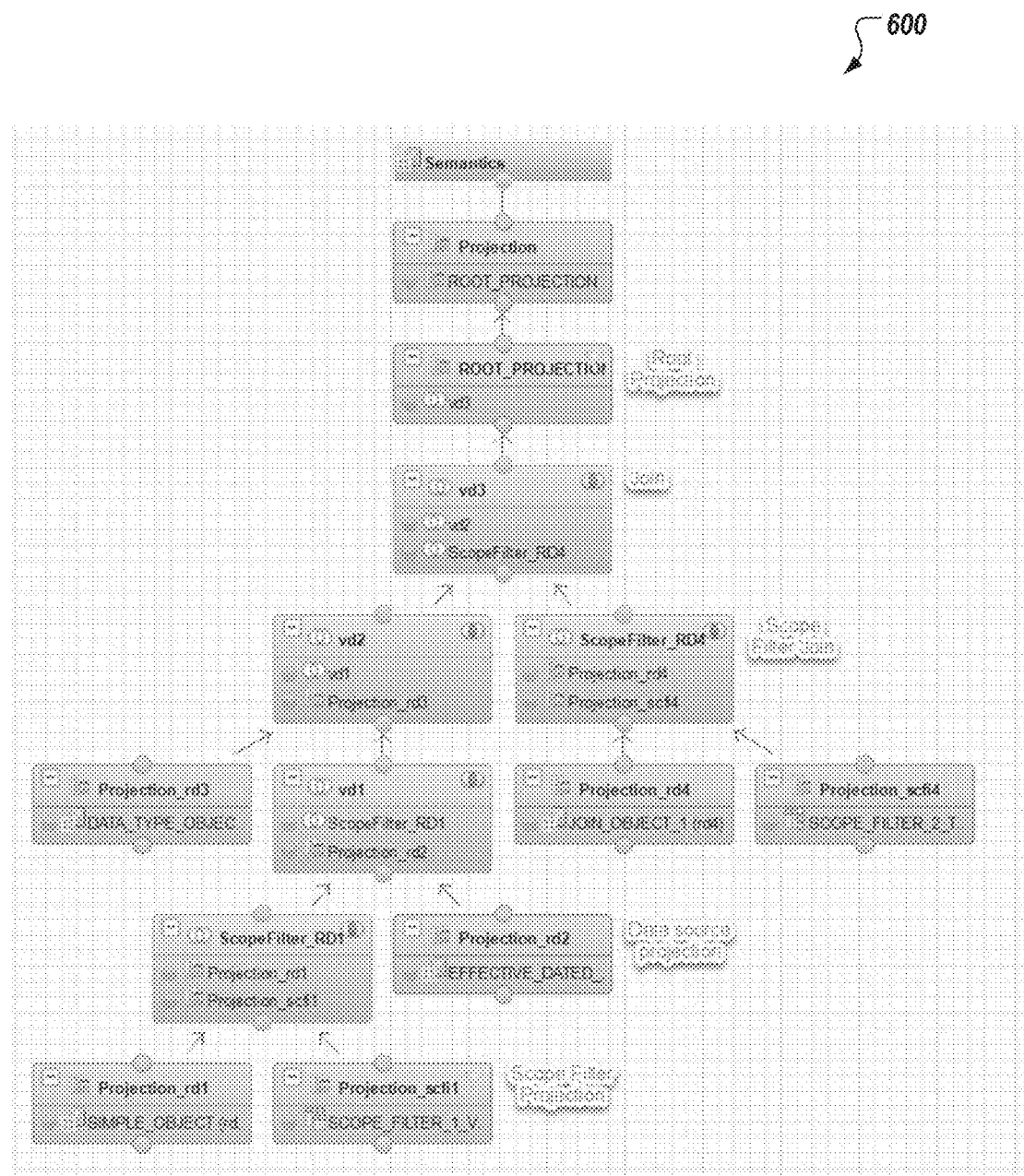
FIG. 6 depicts an example scope calculation in accordance with implementations of the present disclosure.

FIG. 6 depicts an example scope calculation 600 in accordance with implementations of the present disclosure. In some implementations, the scope filter application contains a data source including, for example, a table function, or a database view. In addition, the scope filter application describes which data source, and how the scope filter data source is to be joined. In FIG. 6, ScopeFilter_RD1, for example, is the result view of the scope filter scfi1 applied on the object rd1. In order to achieve the filter characteristics, scope filter data sources are inner-joined to the base data sources.

Scope filter data sources can be parametrized in multiple ways. Scope filters can already be parametrized by the transactional system. This can be done on the basis of defined metadata structure (e.g., provided in the application server 208 of FIG. 2). The transactional system could provide a defined value for a certain parameter, or a list of options for a certain scope filter parameter. The concrete selection of this option can be either done in the definition of the query by the end user. In this case, the QMS is already able to enrich the query calculation scenario, such that the selected parameter is considered. Alternatively, the selection of the parameter can be done by the end user, who is executing the query. In this case, the parametrization will be done by the underlying calculation engine. Another parametrization option is a based on a function which can only be computed on query execution. An example of this is the user who is executing the query. A parametrization of the scope is to be done by the QMS in this case.

Accordingly, implementations of the present disclosure provide a mechanism to apply application-specific filters as part of the live data connectivity between an analytics platform, and a transactional system. Scope filters are a major building block for real application scenarios, because they support complex, user-based and parametrized filters with an easy structured application of base filter methods.

Another challenge of integrating transactional application systems with analytics platforms is to provide scenario-specific filters, and data wrangling functions that are pre-configured for user-based parameters, and that can be further adopted by the end user. In accordance with implementations of the present disclosure, a raw calculation scenario is defined by the user in the browser application (e.g., the browser 206 of FIG. 2). A filter and data wrangling engine enriches the calculation scenario so that end user can set appropriate column-specific filters. The user is also able to combine arbitrary columns to tailor the analytical output.

In further detail, the QMS (e.g., the QMS 218 of FIG. 2) includes a raw calculation scenario, a filter and data wrangling engine, and an enriched calculation scenario. As described herein, specific data structures are input to the filter and data wrangling engine, and are the basis for the a tailored calculation scenario. These data structures are sent to the transactional database system (e.g., the database system 210 of FIG. 2), and are used to enrich the raw calculation scenario.

In some implementations, filters are defined based on a recursion algorithm. In some examples, the logical condition nodes, example pseudo-code detailed above, define basic filters at the data source level. It is possible to apply specific filters based on value comparison, column comparison, and user functions (e.g., comparing a date with the current date). In some implementations, a Boolean result of the logical condition nodes can be nested into a filter operator, example pseudo-code detailed above, which itself includes a combination of filter operators, and logical condition nodes. Accordingly, the overall filter, example pseudo-code detailed above, includes a combination of logical condition nodes, and filter operators. By this recursive approach, it is possible to cover a relatively wider range of static filter functions.

Figure 7:
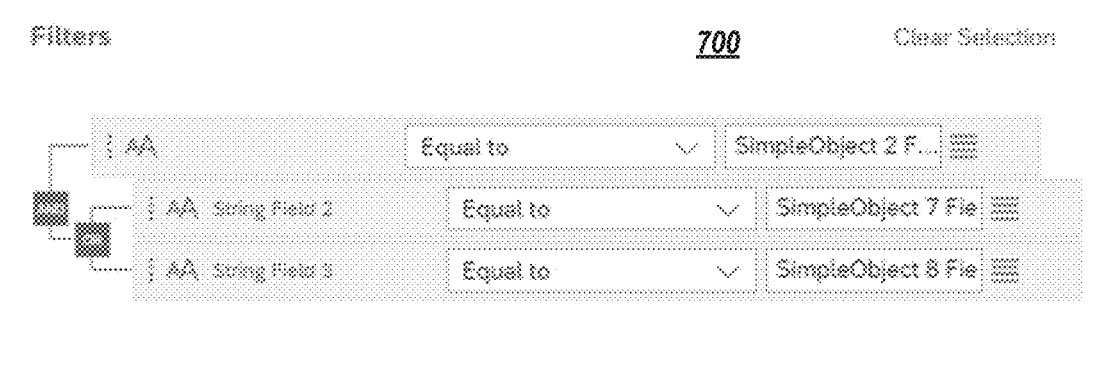
FIG. 7 depicts an example filter definition user interface, and an associated file format definition in accordance with implementations of the present disclosure.

FIG. 7 depicts an example filter definition UI 700, and an associated file format definition 702 (e.g., resulting pseudo-code).

In some examples, analytical reports can require the definition of virtual fields including a combination of physical data source fields, functions, and the like. By way of non-limiting example, the data columns first name and last name of an employee are to be displayed as a concatenated column of both strings. For this example, the data structure below provides a generic formulation of such data wrangling algorithms:

```
"calculatedFields": [{
    "name": "String (calculated field name, ex:FULL_NAME",
    "type": "Enumeration: attribute|measure",
    "dataType": "Enumeration BIGINT|BOOLEAN|DATE|DECIMAL|FLOAT|INTEGER|NVARCHAR|REAL|SECONDDATE|...",
    "length": Integer: length of ther calculated field content
    "scale": Integer: (only for DECIMAL, ex: scale=3 --> calculatedField= 12.987),
    "semanticType": "Enumeration: currencyCode("currencyCode")|unitOfMeasure("unitOfMeasure")|space("")",
    "aggregationType": "Enumeration: sum|max|count|min (default value: sum) ",
        "formula": {...}
        OR
        "constant": {...}
        OR
        "column": {...}
    }
}]
```

In some examples, function can be provided as:

```
"function": {
    "name": "String (supported values now are:+,* to be extended)",
    "parameters": [{
        "formula1"
    }, {
        "formula2"
    }] (List of formulas, ex:
    "parameters": [{
        "constant": {
            "value": " ",
            "valueType": "NVARCHAR"
        }
    }, {
        "column": {
            "dataSourceId": "rd3",
            "type": "DATA_SOURCE_FIELD",
            "fieldId": "VARCHAR_FIELD"
        }
    }]
    )
}
```

In some examples, constant can be provided as:

```
"constant": {
    "value": "String",
    "valueType": "Enumeration: BIGINT|BOOLEAN|DATE|
        DECIMAL|DOUBLE|FLOAT
        |INTEGER|NVARCHAR|REAL",
}
ex: "constant": {
    "value": " ",
    "value Type": "NVARCHAR"
}
```

In some examples, column can be provided as:

```
"column": {
    "dataSourceId ": "String",
    "type": "Enumeration: DATA_SOURCE_FIELD|
        CALCULATED_COLUMN_FIELD_ID",
    "fielId": "String"
}
ex: "column": {
    "dataSourceId": "rd3",
    "type": "DATA_SOURCE_FIELD",
    "fieldId": "VARCHAR_FIELD"
}
```

Accordingly, implementations of the present disclosure enable column-specific filters, and data wrangling in the transactional system (e.g., the data center 204 of FIG. 2).

Another challenge of integrating transactional application systems with analytics platforms is query definition content management across the involved distributed systems (e.g., the analytics platform, the transaction system). In view of this, implementations of the present disclosure provide a query repository in the analytics platform (e.g., the data center 202 of FIG. 2), and a corresponding mirror query repository, and analytical metadata in the transactional system (e.g., the data center 204 of FIG. 2).

Figure 8:
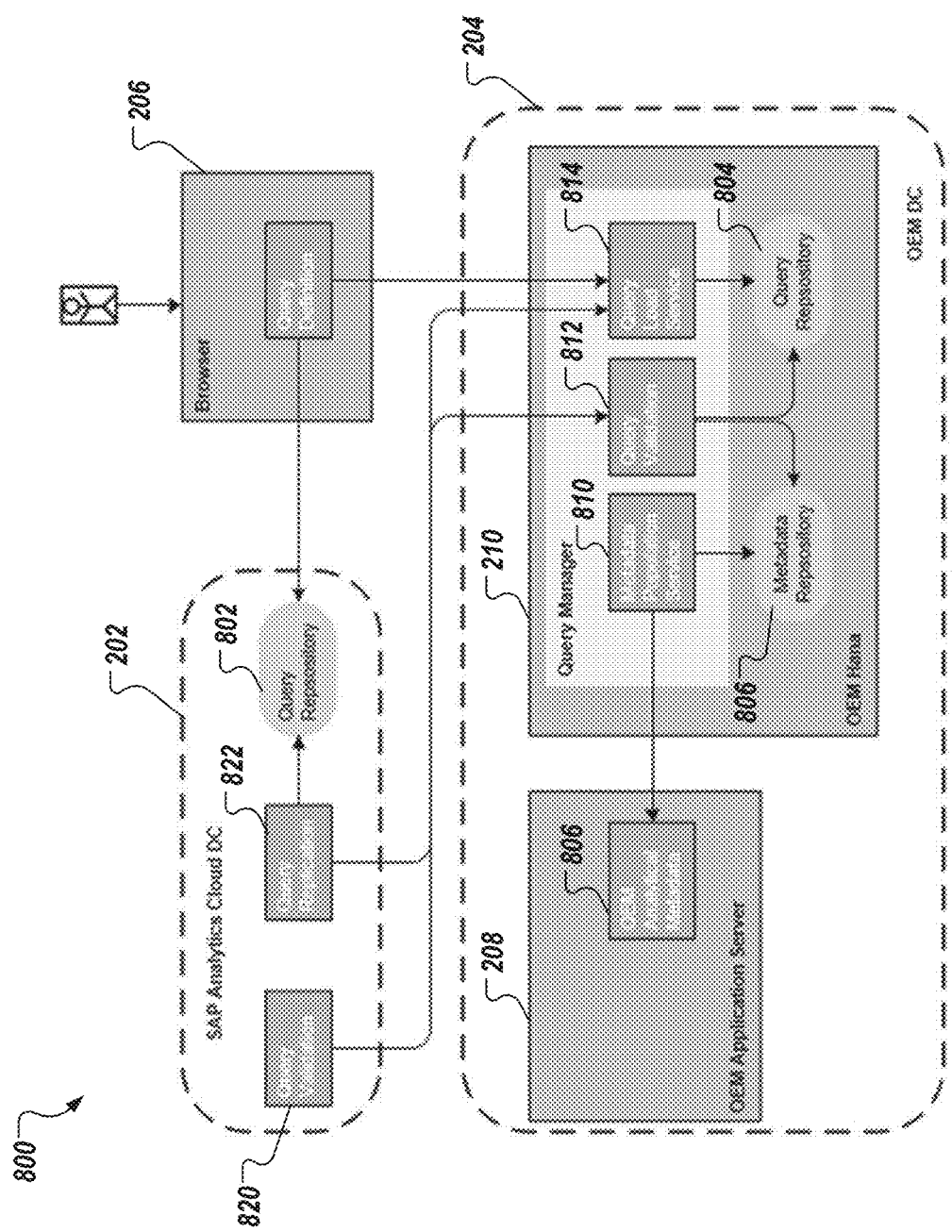
FIG. 8 depicts another example conceptual architecture in accordance with implementations of the present disclosure.

FIG. 8 depicts another example conceptual architecture 800 in accordance with implementations of the present disclosure. The conceptual architecture 800 of FIG. 8 mirrors that described herein with reference to FIG. 2. In the example of FIG. 8, a query repository 802 is provided in the data center 202, a query repository 804, and an analytical metadata repository 805 are provided in the data center 204. In the depicted example, the query repository 804 is provided in the database system 210, and the analytical metadata 806 is provided in the application server 208. Further, the QMS 218 includes a metadata population service 810, a query validation service 812, and a query load service 814. The data center 202 includes a query validation service 820, and a query replication service 822.

In some implementations, the query repository 804 provides an inventory of all query-level calculation scenarios in the database system 210. In some examples, the query repository 804 provides a set of queries that are available to display to the user. In some examples, the query repository 804 stores information that can be used to successfully re-create the query builder UI of a query. In some examples, the query repository 804 is used to distribute query content in a complex system landscape. In some implementations, the metadata repository 805 persists the analytical metadata that is used as an input for the setup of the query scenarios.

In some implementations, the underlying analytical model of the transactional system (e.g., the data center 204), and its corresponding metadata undergo changes during production use, because data model changes are common. In addition, even in production systems underlying changes of the analytical models are common (e.g. yearly performance management cycle). Administrative tools are provided to manage lifecycle events in a robust and reliable way. In some examples, the query repository is the basis for the administrative tools.

In some implementations, queries can be validated against the metadata representations of the underlying analytical model provided by the respective transactional application (e.g., executed on the application server 208). The query validation can be performed by comparing metadata of the current query with metadata stored in the metadata repository. In some examples, the query-level calculation view is adapted in view of changes to the underlying analytical model of the transactional application. Depending on the severity, these changes can either be done automatically, or the query will be labelled as invalid, so that an administrator can fix any issues manually.

In some instances, implementation projects in the transactional system require content transport management. This can include, for example, the transportation of queries from a test system to a production system. Implementations of the present disclosure provide administration services to achieve this. As a basis for these administration services, implementations of the present disclosure enable loading of queries to the query repository. The query repository is used to manage the content lifecycle. In some examples, default queries can be provided (e.g., by the third-party provider of the analytics platform), and are imported into the query repository of the transactional system. In some examples, the default queries can be used as a template to tailor a query.

Figure 9:
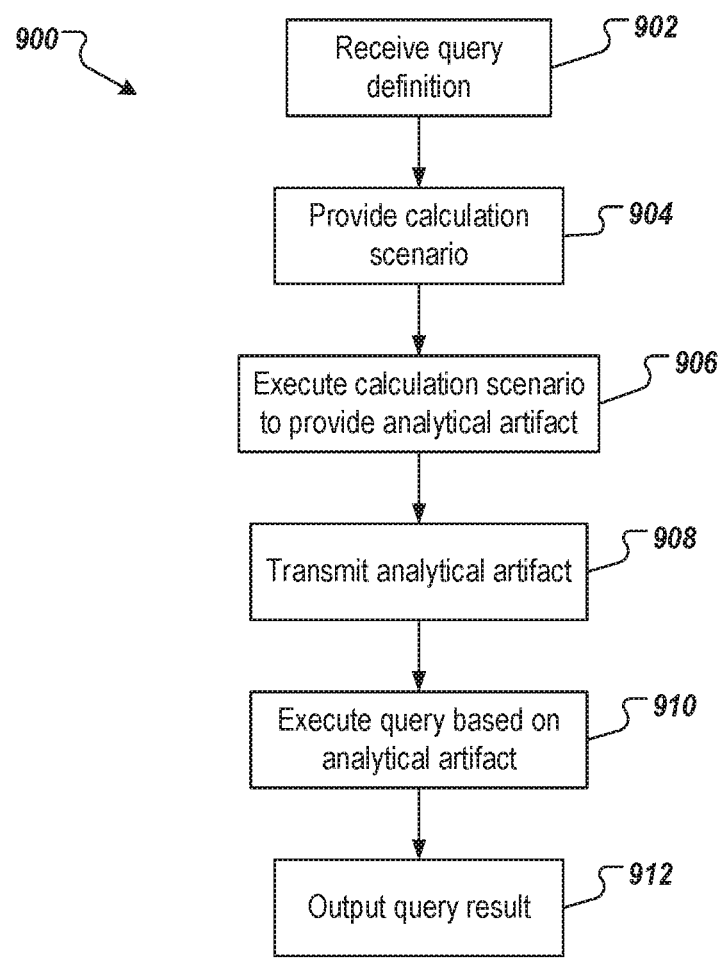
FIG. 9 depicts an example process in accordance with implementations of the present disclosure.

FIG. 9 depicts an example process 900 that can be executed in accordance with implementations of the present disclosure. In some examples, the example process 900 can be provided by one or more computer-executable programs executed using one or more computing devices. For example, the example process 900 can be executed by the data center 202, and the data center 206.

A query definition is received (902). For example, the QMS 218 executed within the data center 204 receives a query definition provided from the browser 206 of an analytics platform executed within the data center 202. A calculation scenario is provided (904). For example, the QMS 218 provides a calculation scenario based on the query definition. In some examples, the calculation scenario is provided as an object model. In some examples, the object model is a graph that includes a plurality of base calculation views that are connected by at least one join relationship.

In some examples, the calculation scenario is an enhanced calculation scenario that is provided based on a raw calculation scenario including one or more filters. In some examples, the enhanced calculation scenario incorporates one or more relationships based on at least one of the one or more filters. In some examples, at least one filter of the one or more filters is provided based on user-specific permission metadata that is retrieved from an application executing within the data center 204. In some examples, the one or more filters includes at least one scope filter that describes joining of at least a portion of data from a data sources, and that indicates at least one parameter to affect data that is to be joined. In some examples, the raw calculation scenario is processed by a filter and wrangling engine to provide the enriched calculation scenario, the filter and wrangling engine applying column-specific filters, and enabling combination of arbitrary columns to tailor the analytical artifact.

The calculation scenario is executed to provide an analytical artifact (906). For example, the calculation engine 222 within the data center 204 executes the calculation scenario to provide the analytical artifact 224. In some examples, the analytical artifact includes a query-level calculation view on transactional data (e.g., at least a portion of the transactional data 205) stored in the data center 204. The analytical artifact is transmitted (908). For example, the data center 204 transmits the analytical artifact for use by the data center 202.

A query is executed based on the analytical artifact (910). For example, an analytics platform executed on the data center 202 executes a query corresponding to the query definition based on the analytical artifact. A query result is provided as output (912). For example, the data center 202 provides output of query execution to the browser 206 for display to the user 212.

Figure 10:
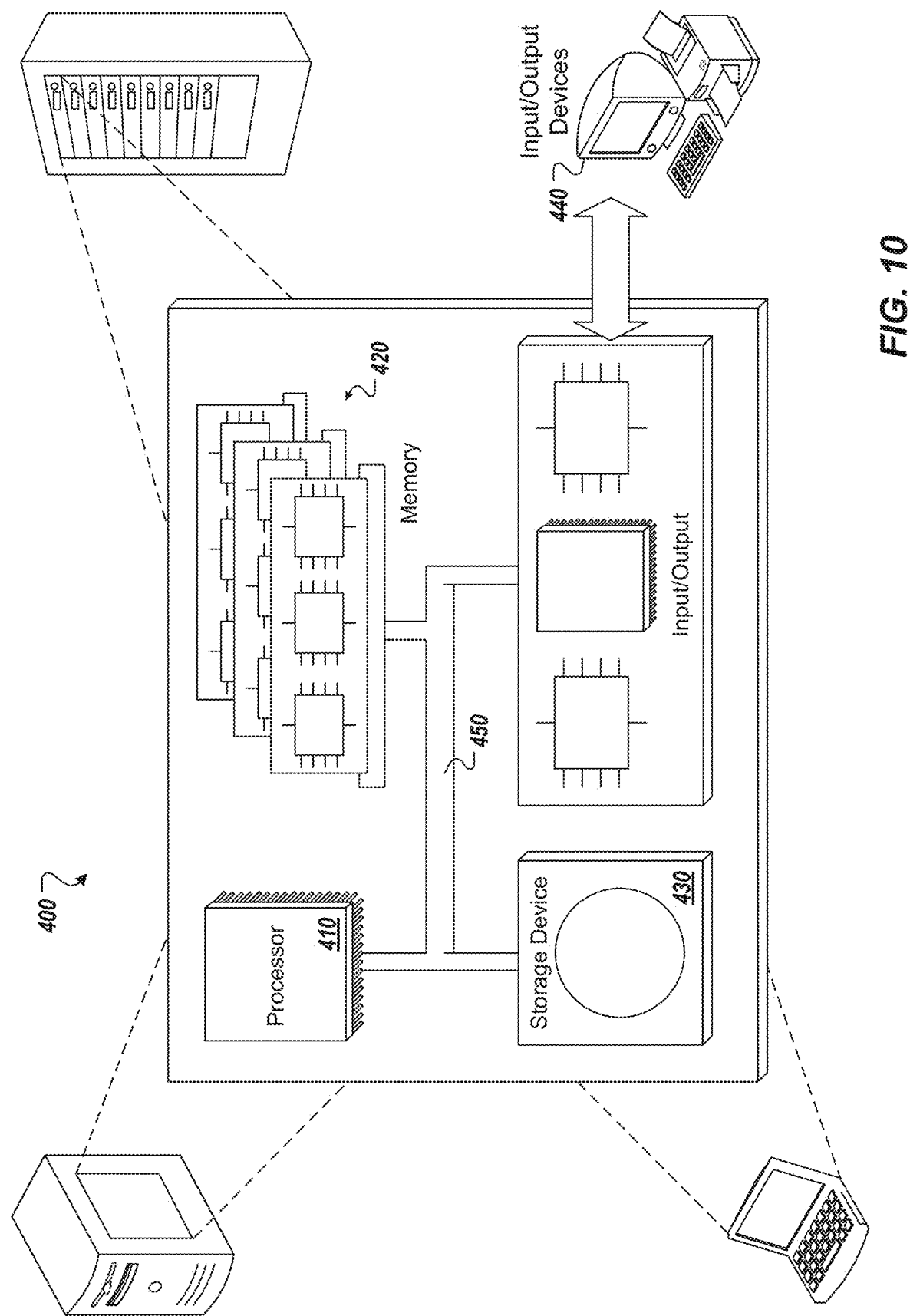
FIG. 10 is a schematic illustration of example computer systems that can be used to execute implementations of the present disclosure.

Referring now to FIG. 10, a schematic diagram of an example computing system 1000 is provided. The system 1000 can be used for the operations described in association with the implementations described herein. For example, the system 1000 may be included in any or all of the server components discussed herein. The system 1000 includes a processor 1010, a memory 1020, a storage device 1030, and an input/output device 1040. The components 1010, 1020, 1030, 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit. The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device. The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A method for data analytics in a first data center using transactional data of a second data center, the method being executed by one or more processors and comprising:
   receiving, by a query manager service (QMS) executed within the first data center, a query definition provided from a browser of an analytics platform executed within the second data center, the query definition being associated with a user having cell-based permissions, row-based permissions, and field-based permissions assigned thereto for accessing at least a portion of transactional data stored within the first data center;
   providing, by the QMS, a raw calculation scenario as an object model based on the query definition and one or more filters;
   processing, by the QMS, the raw calculation scenario to provide an enhanced calculation scenario, the enhanced calculation scenario incorporating one or more relationships based on at least one of the one or more filters;
   executing, by a calculation engine within the first data center, the enhanced calculation scenario to provide an analytical artifact comprising a query-level calculation view on transactional data stored in the first data center, executing comprising using one or more of a row permission base join, a cell permission base join, and a permission compound join to provide a root compound projection to determine the transactional data that the user is allowed to access based on the field-based permissions; and
   transmitting, by the first data center, the analytical artifact to the second data center to perform analytics on at least a portion of the transactional data stored in the first data center.

2. The method of claim 1, wherein the raw calculation scenario is an analytical calculation scenario represented by a directed acyclic graph, in which one or more base calculation views from the first data center are connected using join relationships.

3. The method of claim 1, wherein the one or more filters are provided based on user-specific permission metadata that is retrieved from an application executing within the first data center.

4. The method of claim 1, wherein the enhanced calculation scenario is transferred into an analytical representation that is passed to the calculation engine for execution to provide the analytical artifact.

5. The method of claim 1, wherein the raw calculation scenario is processed by a filter and wrangling engine to provide the enhanced calculation scenario, the filter and wrangling engine applying column-specific filters and enabling combination of arbitrary columns to tailor the analytical artifact.

6. The method of claim 1, wherein the one or more filters comprise at least one scope filter that describes joining of at least a portion of data from a data sources, and that indicates at least one parameter to affect data that is to be joined.

7. The method of claim 1, wherein at least a portion of the transactional data is provided from execution of an application within the first data center.

8. A non-transitory computer-readable storage medium coupled to one or more processors and having instructions stored thereon which, when executed by the one or more processors, cause the one or more processors to perform operations for data analytics in a first data center using transactional data of a second data center, the operations comprising:
   receiving, by a query manager service (QMS) executed within the first data center, a query definition provided from a browser of an analytics platform executed within the second data center, the query definition being associated with a user having cell-based permissions, row-based permissions, and field-based permissions assigned thereto for accessing at least a portion of transactional data stored within the first data center;
   providing, by the QMS, a raw calculation scenario as an object model based on the query definition and one or more filters;
   processing, by the QMS, the raw calculation scenario to provide an enhanced calculation scenario, the enhanced calculation scenario incorporating one or more relationships based on at least one of the one or more filters;
   executing, by a calculation engine within the first data center, the enhanced calculation scenario to provide an analytical artifact comprising a query-level calculation view on transactional data stored in the first data center, executing comprising using one or more of a row permission base join, a cell permission base join, and a permission compound join to provide a root compound projection to determine the transactional data that the user is allowed to access based on the field-based permissions; and
   transmitting, by the first data center, the analytical artifact to the second data center to perform analytics on at least a portion of the transactional data stored in the first data center.

9. The non-transitory computer-readable storage medium of claim 8, wherein the raw calculation scenario is an analytical calculation scenario represented by a directed acyclic graph, in which one or more base calculation views from the first data center are connected using join relationships.

10. The non-transitory computer-readable storage medium of claim 8, wherein the one or more filters are provided based on user-specific permission metadata that is retrieved from an application executing within the first data center.

11. The non-transitory computer-readable storage medium of claim 8, wherein the enhanced calculation scenario is transferred into an analytical representation that is passed to the calculation engine for execution to provide the analytical artifact.

12. The non-transitory computer-readable storage medium of claim 8, wherein the raw calculation scenario is processed by a filter and wrangling engine to provide the enhanced calculation scenario, the filter and wrangling engine applying column-specific filters and enabling combination of arbitrary columns to tailor the analytical artifact.

13. The non-transitory computer-readable storage medium of claim 8, wherein the one or more filters comprise at least one scope filter that describes joining of at least a portion of data from a data sources, and that indicates at least one parameter to affect data that is to be joined.

14. The non-transitory computer-readable storage medium of claim 8, wherein at least a portion of the transactional data is provided from execution of an application within the first data center.

15. A system, comprising:
  a computing device; and
  a non-transitory computer-readable storage device coupled to the computing device and having instructions stored thereon which, when executed by the computing device, cause the computing device to perform operations for data analytics in a first data center using transactional data of a second data center, the operations comprising:
    receiving, by a query manager service (QMS) executed within the first data center, a query definition provided from a browser of an analytics platform executed within the second data center, the query definition being associated with a user having cell-based permissions, row-based permissions, and field-based permissions assigned thereto for accessing at least a portion of transactional data stored within the first data center;
    providing, by the QMS, a raw calculation scenario as an object model based on the query definition and one or more filters;
    processing, by the QMS, the raw calculation scenario to provide an enhanced calculation scenario, the enhanced calculation scenario incorporating one or more relationships based on at least one of the one or more filters;
    executing, by a calculation engine within the first data center, the enhanced calculation scenario to provide an analytical artifact comprising a query-level calculation view on transactional data stored in the first data center, executing comprising using one or more of a row permission base join, a cell permission base join, and a permission compound join to provide a root compound projection to determine the transactional data that the user is allowed to access based on the field-based permissions; and
    transmitting, by the first data center, the analytical artifact to the second data center to perform analytics on at least a portion of the transactional data stored in the first data center.

16. The system of claim 15, wherein the raw calculation scenario is an analytical calculation scenario represented by a directed acyclic graph, in which one or more base calculation views from the first data center are connected using join relationships.

17. The system of claim 15, wherein the one or more filters are provided based on user-specific permission metadata that is retrieved from an application executing within the first data center.

18. The system of claim 15, wherein the enhanced calculation scenario is transferred into an analytical representation that is passed to the calculation engine for execution to provide the analytical artifact.

19. The system of claim 15, wherein the raw calculation scenario is processed by a filter and wrangling engine to provide the enhanced calculation scenario, the filter and wrangling engine applying column-specific filters and enabling combination of arbitrary columns to tailor the analytical artifact.

20. The system of claim 15, wherein the one or more filters comprise at least one scope filter that describes joining of at least a portion of data from a data sources, and that indicates at least one parameter to affect data that is to be joined.

* * * * *